(12) United States Patent
Jensen et al.

(10) Patent No.: US 9,264,770 B2
(45) Date of Patent: Feb. 16, 2016

(54) SYSTEMS AND METHODS FOR GENERATING MEDIA ASSET REPRESENTATIONS BASED ON USER EMOTIONAL RESPONSES

(71) Applicant: United Video Properties, Inc., Santa Clara, CA (US)

(72) Inventors: Paul Jensen, Menlo Park, CA (US); Daniel Thomas Ward, Encino, CA (US); Martin Schink, Aachen (DE); Leander Carell, Halle (DE)

(73) Assignee: Rovi Guides, Inc., Santa Clara, CA (US)

( * ) Notice: Subject to any disclaimer, the term of this patent is extended or adjusted under 35 U.S.C. 154(b) by 0 days.

(21) Appl. No.: 14/329,656

(22) Filed: Jul. 11, 2014

(65) Prior Publication Data

US 2015/0067708 A1    Mar. 5, 2015

Related U.S. Application Data

(60) Provisional application No. 61/872,197, filed on Aug. 30, 2013.

(51) Int. Cl.
*H04N 21/442* (2011.01)
*H04N 21/475* (2011.01)
*H04N 21/482* (2011.01)

(52) U.S. Cl.
CPC ..... *H04N 21/44218* (2013.01); *H04N 21/4756* (2013.01); *H04N 21/4826* (2013.01)

(58) Field of Classification Search
CPC .............................................. H04N 21/44218
See application file for complete search history.

(56) References Cited

U.S. PATENT DOCUMENTS

| | | | |
|---|---|---|---|
| 6,239,794 B1 | 5/2001 | Yuen | |
| 6,388,714 B1 | 5/2002 | Schein | |
| 6,564,378 B1 | 5/2003 | Satterfield | |
| 6,756,997 B1 | 6/2004 | Ward | |
| 7,165,098 B1 | 1/2007 | Boyer | |
| 8,046,801 B2 | 10/2011 | Ellis | |
| 8,332,427 B2 | 12/2012 | Whitby | |
| 2002/0174430 A1 | 11/2002 | Ellis | |
| 2003/0110499 A1 | 6/2003 | Knudson | |
| 2005/0251827 A1 | 11/2005 | Ellis | |
| 2010/0153885 A1 | 6/2010 | Yates | |
| 2012/0324491 A1* | 12/2012 | Bathiche et al. | 725/10 |

OTHER PUBLICATIONS

Johnson-laird et al., "Language of emotions: An Analysis of a Semantic Field", Jan. 2008, Princeton University.*

* cited by examiner

*Primary Examiner* — Nathan Flynn
*Assistant Examiner* — James R Marandi
(74) *Attorney, Agent, or Firm* — Ropes & Gray LLP

(57) ABSTRACT

Systems and methods for generating a representation of a video media asset for inclusion in a media asset listing for the video media asset is considered. User emotional responses that occur while the video media asset is presented to the user are monitored using a processor. A user emotional response selection criterion is retrieved from a storage device, and based on the retrieved user emotional response selection criterion, one of the monitored user emotional responses is selected. An identification is made of the portion of the video media asset presented to the user when the selected one of the user emotional response occurred, and a representation of the identified portion is generated for the video media asset for inclusion in a media asset listing for the video media asset.

14 Claims, 10 Drawing Sheets

SYSTEMS AND METHODS FOR GENERATING MEDIA ASSET REPRESENTATIONS BASED ON USER EMOTIONAL RESPONSES

CROSS REFERENCE TO RELATED APPLICATION

This disclosure claims the benefit under 35 U.S.C. §119(e) of U.S. Provisional Application No. 61/872,197, filed Aug. 30, 2013, which is incorporated herein by reference in its entirety.

BACKGROUND

A media guidance application provides media guidance data to users through an interface that allows users to efficiently navigate content selections to identify media content that they may desire. For example, a media asset listing may provide graphical representations such as cover art, still images and video clip previews to indicate the content described by the media guidance data in the listing. Such graphical representations can be produced as part of and distributed together with media assets by a content provider.

In creating media asset representations for use by a media guidance application, conventional systems often rely on general population statistics collected through reviews or surveys to identify the most popular characters or scenes, without taking into account variations in individual user interests in different portions of a media asset.

SUMMARY

In view of the foregoing, systems and methods for generating media asset representations based on user reactions are provided. In particular, systems and methods for generating media asset representations based on user emotional responses are provided. By analyzing user reactions measured through sensing devices when a media asset is present to a user of a user equipment device, different types of user emotional responses to a media asset can be identified by an emotional response analyzer, and characteristics of the user emotional responses can be quantified. Comparison of identified user emotional responses to a user emotional response selection criterion then gives rise to one or more corresponding portions of the media asset, to be used in generating a graphical representation for the media asset, where the graphical representation is to be included in a program listing as part of a media guidance application.

In some embodiments, user emotional responses that occur while a media asset is presented to the user is determined from user reaction data collected through physical, physiological and neurological sensing devices included as part of a user input interface to the user equipment. Measurements collected by the sensing devices are sent to an emotional response analyzer for translation into user reaction data. For example, measured changes in curvature of the lips may be interpreted as a smile, and a smile indicates that the user is in a pleased or amused mood.

In some embodiments, characteristics such as duration and intensity of user emotional responses are measured and relied upon for determining how strong a particular emotional response is. Characteristics of emotional responses may be further correlated or compared to pre-defined values for quantization into a reaction score. Such a reaction score enables comparison among emotional responses of different types. A reaction score may be based on a single characteristic or multiple characteristics of a user emotional response, depending on the desirable purpose of the reaction score. For example, a reaction score may depend on duration of emotional responses only, or both duration and intensity. Distinct characteristics of an emotional response may be weighted differently across different types of emotional responses in calculating reaction scores. For example, it is more desirable to emphasize the duration of an emotional response such as grief, which may involve crying, but less so if the emotional response is surprise, which occurs over a very short period of time.

In some embodiments, the user emotional response selection criterion includes a user reaction score computed as a function of the characteristics of a user emotional response. One or more measured user emotional reactions are analyzed to determine user emotional responses and corresponding characteristics, and a quantitative user reaction score may be computed as a weighted function of the determined characteristics. Such user reaction scores for the monitored user emotional responses may be ranked, and the emotional response with the highest rank may be used for generating representations of the media asset. Weights for computing reaction scores may be pre-defined and stored in a database local to the user equipment device, or in a remote database implemented on a server connected to the user equipment device. Such weights may depend on types of user emotional responses. Sample types of user emotional responses may include agitation, amusement, anger, annoyance, astonishment, attentiveness, boredom, calmness, disappointment, disgust, fear, grief, indifference, nervousness, rage, sadness, surprise, and terror.

In some embodiments, the user emotional response selection criterion may also depend on attributes of the media asset. Sample media asset attributes may include genre, sub-genre, setting, theme, content type, artistic status, and target audience. A mood associated with an identified media attribute may be determined, and user emotional responses with types similar to or different from the determined mood may be selected for generating media asset representations. For example, if the media asset is a comedy, the user emotional response selection criterion may limit potential emotional responses to amusement and joy only if the media representation is to be generated from emotional responses with types similar to the mood of the media asset. Similarly, potential emotional responses for generating media representations to a comedy may be limited to agitation, anger, annoyance, and disgust, without amusement and joy, if emotional responses with types different from the mood of the media asset are to be used for generating media representations.

Once one or more user emotional responses to a media asset have been selected, corresponding portions of the media asset can be identified, and media representations may be created from the identified portions of the media asset. Media representations such as graphical images and trailer clips may be generated by systems and methods described in the present disclosure in various ways. For example, a graphical representation may be a single frame randomly captured from an identified portion of the media asset; a graphical representation may also be a single frame corresponding to the moment when the user showed the most intense or strongest emotional response. In another example, a graphical representation may be a collage of a plurality of frames captured from the one or more identified portions of the media asset, or a collage of characters that have appeared in the one or more identified portions of the media asset.

BRIEF DESCRIPTION OF THE DRAWINGS

The above and other features of the present disclosure, its nature and various advantages will be more apparent upon consideration of the following detailed description, taken in conjunction with the accompanying drawings, and in which.

DETAILED DESCRIPTION

Figure 1:
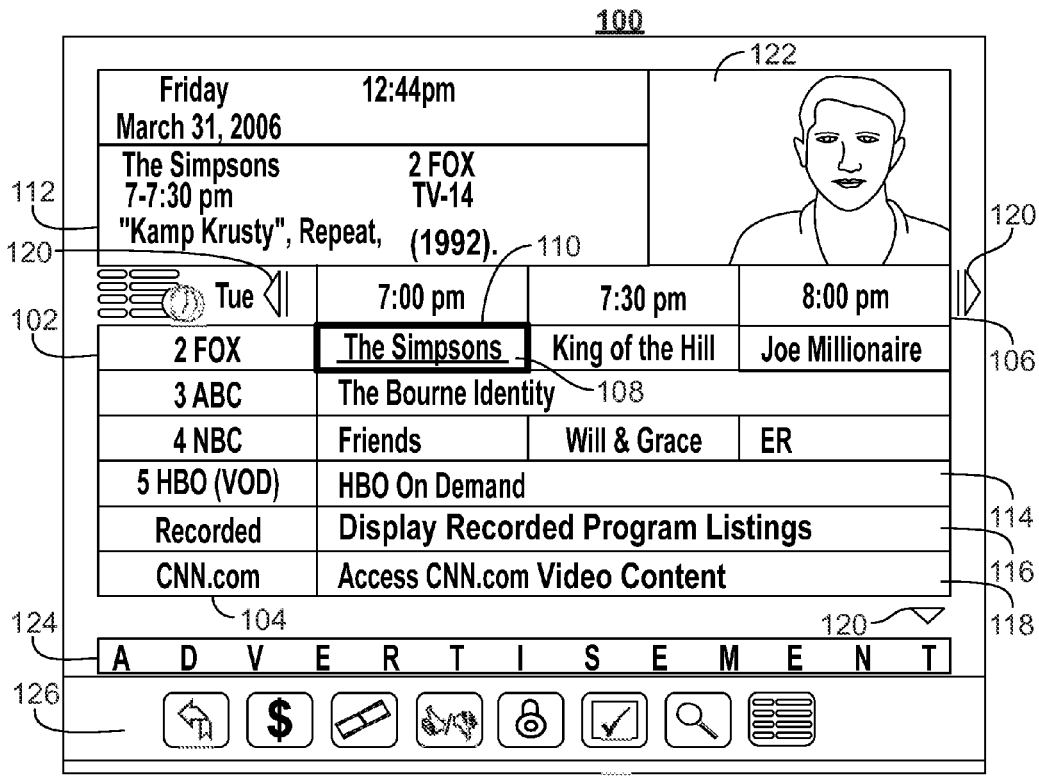
FIG. 1 is a diagram of an interactive grid display in accordance with some embodiments of the disclosure.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
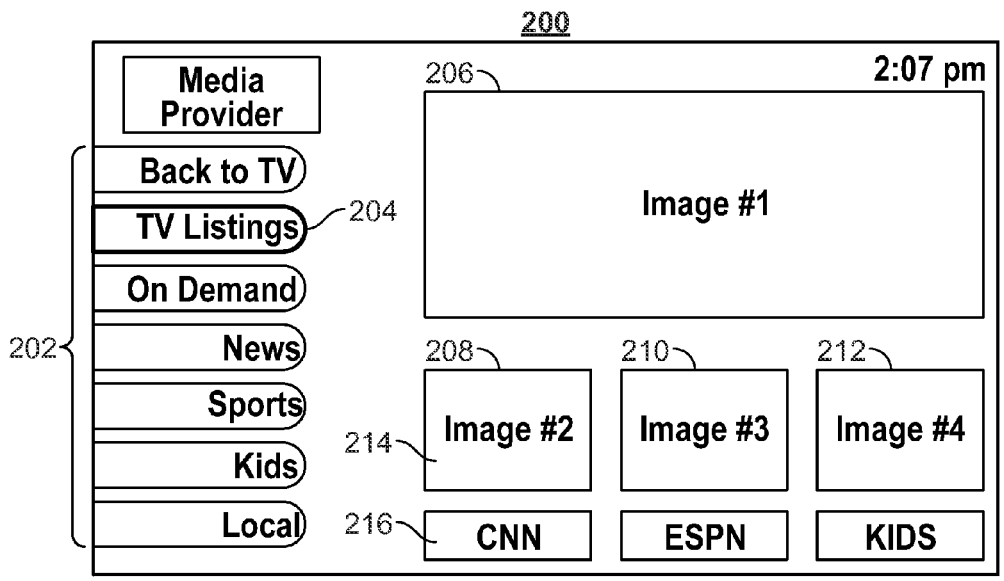
FIG. 2 is a diagram of an interactive media system in accordance with some embodiments of the disclosure.

FIGS. 1-2 show illustrative display screens that may be used to provide media guidance data. The display screens shown in FIGS. 1-2 and 5-8 may be implemented on any suitable user equipment device or platform. While the displays of FIGS. 1-2 and 5-8 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, I I I et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to generate graphical representations for inclusion in program listing, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity and user emotional responses to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, user emotional response driven graphical representations generated from portions of a media asset for display in program listings etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. The media guidance application may monitor user emotional responses to media programs to identify portions of the program that are most interesting to the user. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical representations or images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or the media guidance data provider, or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
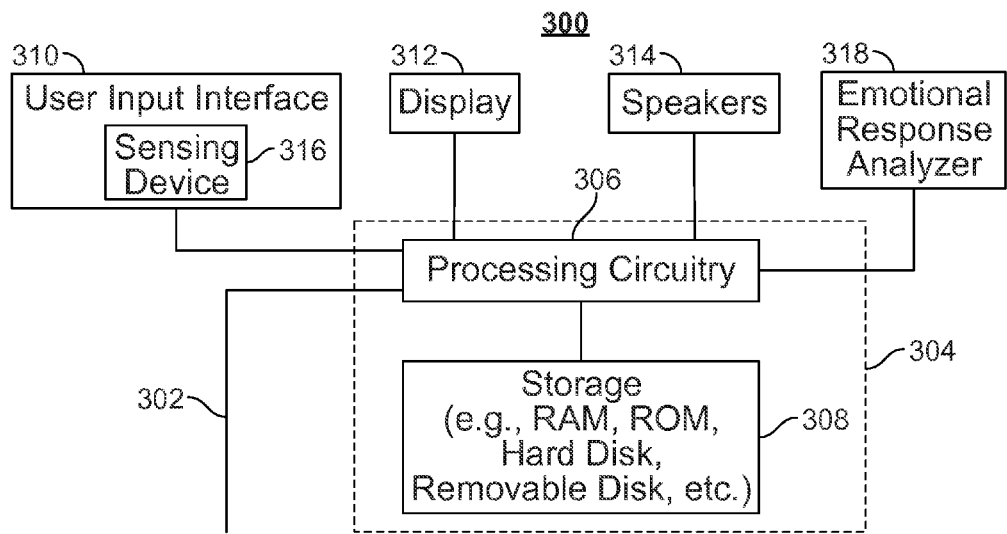
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays, or provide instructions through control circuitry 304 to user input interface 310 to collect user reactions to different media contents. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data.

Control circuitry 304 may further include signal processing units for identifying and extracting frames, shots, scenes, sequences, or other appropriate portions or segments of a media asset, for use in generating audio or graphical representations as part of media guidance data. Correspondingly, control circuitry 304 may include audio, image and video processing units for combining and editing extracted frames or segments into audio or graphical representations.

The circuitry described herein, including for example, the tuning, video generating, encoding, decoding, encrypting, decrypting, scaler, analog/digital circuitry, and frame and segment capture, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. Control circuitry 304 may also collect user reaction data through sensing device 316 included in user input interface 310. User input interface 310 may be any suitable user interface, such as a remote control, mouse, trackball, keypad, keyboard, touch screen, touchpad, stylus input, joystick, voice recognition interface, or other user input interfaces. Sensing device 316 may include one or more image capturing devices, video capturing devices, and motion, physiological, and neurological sensing devices. Image and video capturing devices may include conventional still image cameras, video cameras, thermographic cameras, and other types of image capturing devices capable of extracting facial expressions, eye movements, head and body motions, in conjunction with voice, audio, and speech. Motion, physiological, and neurological sensing devices may include wearable accelerometers, gyroscopes, multisensors, electroencephalograph sensors, electrocardiograph sensors, electromyograph sensors, and physiological sensors capable of detecting posture, body movement, heart rate, blood pressure, body temperature, respiration rate, brainwave, muscle contraction, and other motion, physiological, or neurological signals indicative of a user's emotional state. Motion, physiological, and neurological sensing devices may also include infrared, ultrasonic, microwave, magnetic, or tomographic motion, brainwave, and body temperature detectors that do not need to be worn directly by a user. Furthermore, sensing device 316 may include sensors for detecting ambient light intensity and background noise, which may be used for calibrating captured image, audio, and video data.

Portions of user input interface 310, including sensing device 316, may be connected directly to processing circuitry 306 through a wired connection, as shown in the illustrative user equipment device 300 in FIG. 3, while other portions of user input interface 310 may be implemented as a module separated from and wirelessly connected to processing circuitry 306 through a low-energy communication protocol such as Bluetooth or body area network communication technologies. For example, when user equipment device 300 is a non-portable gaming console, user input interface 310 may comprise a handheld wireless controller and a sensing peripheral mounted on a display screen; when user equipment device 300 is a smartphone or a tablet computer, user input interface 310 may comprise a touchscreen, a front-facing camera, and an additional Bluetooth connected wristband or armband containing a pulse sensor; when user equipment device 300 is a pair of electronic glasses, user input interface 310 may comprise a eye movement sensing device, a microphone, and external buttons on the body of the glasses. User input and user reaction data collected through user input interface 310 may be transferred directly to control circuitry 304 for further processing or storage. Alternatively, user reaction data collected through sensing device 316 within user input interface 310 may be sent to an emotional response analyzer 318 for processing. In the embodiment shown in FIG. 3, sensing device 316 connects to emotional response analyzer 318 through control circuitry 304. In some embodiments, sensing device 316 is directly connected to emotional response analyzer 318, through wired or wireless links. In some other embodiments, part of or the entire sensing device 316 is housed together with emotional response analyzer 318.

Emotional response analyzer 318 may be implemented as an individual module within user equipment device 300, as shown in FIG. 3, or as part of control circuitry 304. Emotional response analyzer 318 comprises control circuits and signal processing units for extracting and processing user reaction data, and for further comprehending and analyzing such user reaction data to identify user emotional responses that occur when a particular media asset is presented to a user. In this disclosure, the term user reaction refers to user physical, physiological, and neurological responses that can be extracted from measurements by sensing device 316, while the term user emotional response refers to a user's emotional state, as identified by analyzing user reaction data, or inputted directly by the user through user input interface 310. For example, measured changes in curvature of the lips may be interpreted as a smile, and a smile indicates that the user is in a pleased or amused mood. As discussed, emotional response analyzing circuitry for extracting and analyzing user reactions and user emotional responses may be provided as one or more separate device modules such as sensing device 316 and emotional response analyzer 318, apart from control circuitry 304.

Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
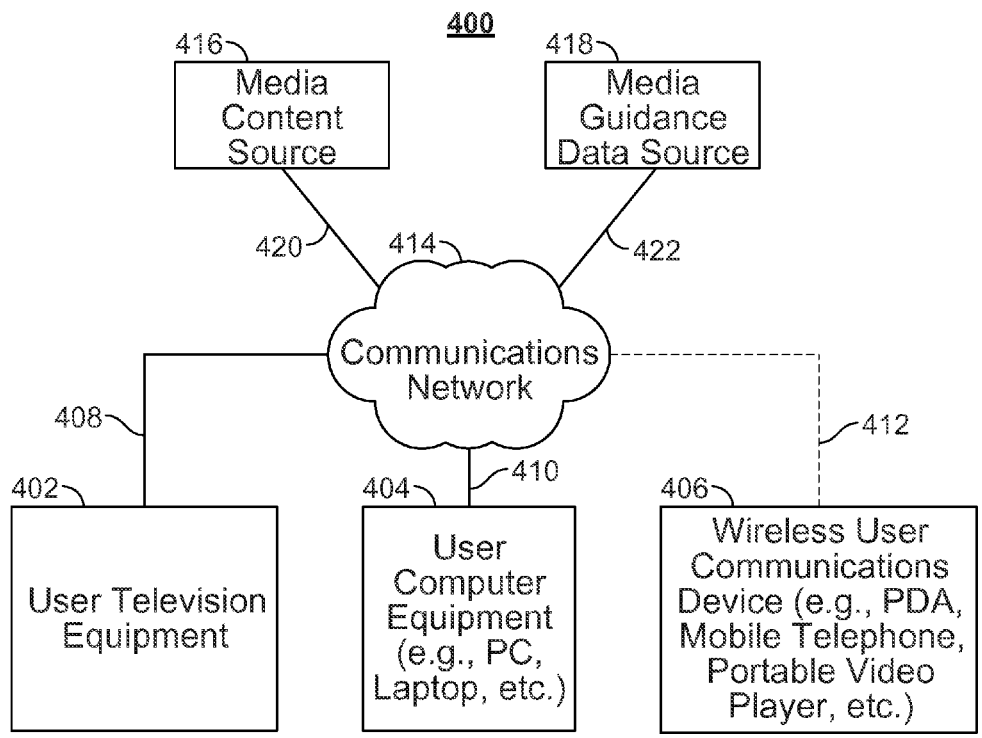
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. As another example, if customized graphical representations have been generated for a program on the user's in-home device, the same graphical representation would appear in a program listing displayed on the user's mobile devices. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. A guidance application client residing on the user's equipment may also initiate sessions with source 418 to upload user profiles, user preferences, media guidance settings, customized media representations, and other guidance data for sharing among multiple devices owned by the user, or multiple devices owned by different users in a group, such as within a household. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, standalone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

In presenting a media asset listing or program listing to users, the video mosaic display arrangement 200 shown in FIG. 2 is often preferred since graphical representations of media assets may convey more information and are generally easier to recognize, especially by younger viewers or seniors who have difficulties reading text information. Graphical listings may also be made selectable, with links for viewing the content, or with information related to the content.

Conventional media guidance systems provide a limited number of graphical representations that are pre-determined by content providers. Such pre-determined graphical representations are generally transmitted together with media content to user equipment device 300 from media content source 416, or transmitted together with other guidance data to user equipment device 300 from media guidance data source 418, through communication network 414. Such graphical representations may be generated by capturing frames or segments from a title sequence or a popular scene in a media asset.

A drawback of using pre-determined graphical representations is that a media asset which has not been viewed previously by the user may be overlooked because the graphical representation shown in the program listing is from a scene that is of little interest to the particular user, although the user may like some other aspects of the media asset. For example, depending on the user's preferences, a graphical representation for the Iron Man 3 movie could be either a close up of the Iron Man suit, with metallic reflections and hues shining through darkness, or a shot where the playboy hero Tony Stark has just rescued Pepper Potts. Some users are more inclined to watch a movie for its visual effects, while others are more interested in the superhero factor or romantic subplots. A customized graphical representation would entice the user to check the movie out, while a graphical representation chosen by the content provider may not necessarily help a movie stand out among the endless stream of other movies.

Even when a media asset has been viewed previously by the user, a pre-determined graphical representation composed of characters and scenes selected by the content provider may still be overlooked by the user, because the graphical representation may fail to induce user recollections of whether the media asset was enjoyable and should be seen again. For example, an image of Bart Simpson writing on a blackboard merely makes the user aware that an episode of The Simpsons is available, while an image of Homer Simpson holding a pet pig upside down may lead the user to watch the episode and sing along with the Spider-Pig Song.

When graphical representations, for example, still images, poster art, cover art, or trailer clips are tailored towards a user's interest, chances of the user viewing the content is higher, and the program listing is more informative and more useful in assisting the user navigate through the ever-increasing supply of media contents. In another setting where media assets in a media listing are priced differently or associated with different advertising costs, the media listing may also guide a user to pick particular media assets with a higher price or a higher advertising fee by showing, for these media assets, representations highly interesting to the user, while showing representations less interesting to the user for media assets not under promotion.

A graphical representation generated from a portion of the media asset that is of special interest to the user may allow the user to remember the main plot or a subplot quickly. This is especially true if the particular portion has stimulated strong emotional responses from the user before, since the user may quickly recall his or her feelings from viewing the media asset upon seeing the graphical representation. A portion of a movie that caused a viewer to cry for a few minutes is more likely to be remembered than another portion to which the viewer was indifferent, even if the latter portion is popular among the general population. Emotions that may be good indicators of user interest include, but are not limited to, agitation, amusement, anger, annoyance, astonishment, attentiveness, boredom, calmness, disappointment, disgust, fear, grief, indifference, nervousness, rage, sadness, surprise, and terror.

Accordingly, systems and methods of the present disclosure are provided for generating graphical representations based on user emotional responses. By analyzing user reactions collected through sensing device 316 when a media asset is presented to the user, different types of user emotional responses to a media asset can be identified by emotional response analyzer 318, and characteristics of the user emotional responses can be quantified. Comparison of identified user emotional responses to a user emotional response selection criterion then gives rise to one or more corresponding portions of the media asset, to be used in generating a graphical representation for the media asset, where the graphical representation is to be included in a program listing as part of a media guidance application.

Figure 5:
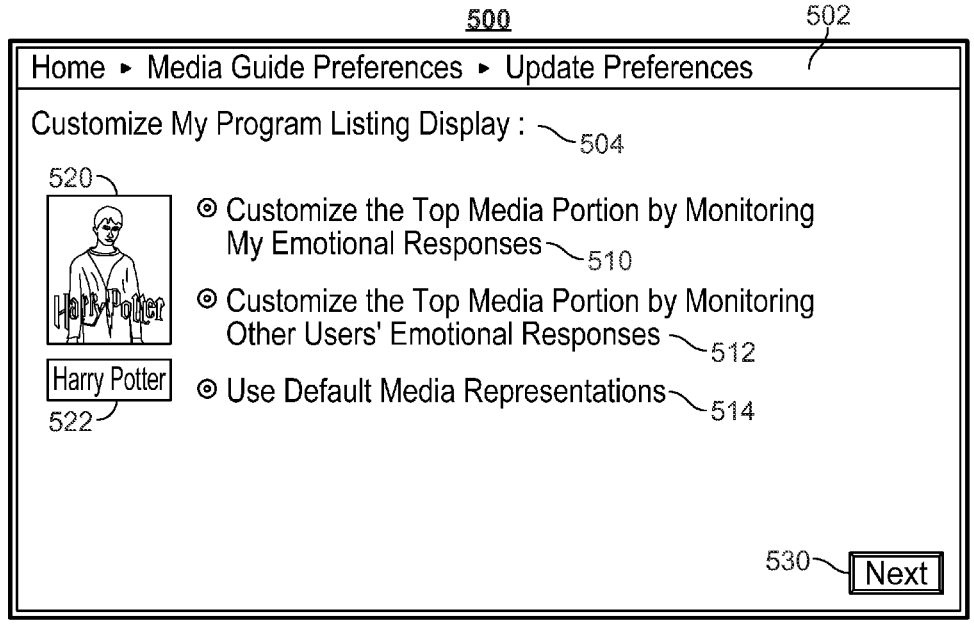
FIG. 5 is an illustrative start screen showing options for providing customized media representations for display in a media listing in accordance with some embodiments of the disclosure.

FIG. 5 is an illustrative start screen 500 displayed on display 312 showing options for providing customized graphical representations for display in a media listing in accordance with some embodiments of the disclosure. Start screen 500 may be accessed through options region 126 shown on screen 100 of FIG. 1, and provides a user of user equipment device 300 with an entry point into choosing update preferences for customizing program listing displays, as also will be discussed in relation to FIG. 6.

Title 502 of screen 500 provides the user of user equipment device 300 with a context for providing update preferences, to indicate to the user that the update preferences are a subset of media guide preferences. Illustrative instruction 504 for interacting with screen 500 shows that the update preferences are related to program listing display. Sample media portion 520 and text portion 522 are provided as examples of how each item in a media listing will be presented to the user, as discussed in connection to FIG. 2.

Update preferences are broken down into three illustrative options 510, 512, and 514 in the embodiment shown in FIG. 5. Selection of option 510 allows the media guidance application to customize media portion 520 according to user emotional responses monitored during the display of the corresponding media asset. Upon selection of option 510, the media guidance application customizes, whenever possible, each item in a program listing with a graphical representation generated from one or more portions of the media asset. Selection of the one of more portions of the media asset is made when corresponding user emotional responses satisfy a user emotional response selection criterion as provided by the media guidance application.

To obtain user emotional responses, user reactions captured from measurements by sensing device 316 is analyzed by emotional response analyzer 318 according to their types and/or other characteristics, as will be discussed in detail in connection with FIG. 7. In some embodiments, selection of option 510 is also considered a command to turn on sensing device 316 when a media asset is presented to a user through display 312. In some embodiments, sensing device 316 is always on, but user reactions are only captured when a media asset is being presented and option 510 has been selected. In other embodiments, user input interface 310 may include a dedicated input such as a button on a remote control for turning on or off the sensing device 316, thus separating the control for capturing user reactions from control for generating and presenting customized graphical representations. In various embodiments, one or more of the steps of monitoring user reactions, analyzing user reactions to identify user emotional responses, comparing user emotional responses against a user emotional response selection criterion to select one or more portions of the media asset, and generating a graphical representation from the selected one or more portions of the media asset may be carried out successively in time, as a continuous sequence of processes, or separately, with the output of each step stored locally or remotely for use by the next step at a later time. Each of the above-mentioned steps may be implemented locally by control circuitry 304, or remotely at media guidance source 418, media content source 416 or some other dedicated signal processing circuitry such as emotional response analyzer 318 connected to control circuitry 304 as shown in FIG. 3.

Selection of option 510 may further prompt the user to enter a unique ID and a password, if the user has not previously logged in, so the customization of graphical representations can be personalized according to the user's own emotional responses previously measured by the system, instead of, for example, emotional responses collected from all users of the same user equipment, or groups of users who have agreed to share their emotional response data across a network. If the user does not wish to log-in as an individual, user reactions may be measured for all users of the same user equipment device. Subsequently, user emotional responses identified from all user reactions measured through user equipment 300 may be collectively processed to identify one or more portions of the media asset.

In some other embodiment of the disclosure, a preference update screen subsequent to screen 500 may further inquire whether the user is willing to share his or her emotional response data with other users in the system, anonymously or otherwise, possibly in combination with other user profile and user preference data. If the user wishes to share, user reaction and/or user emotional response data are stored in a local database or uploaded to a remote database, together with references to corresponding portions of media assets that stimulated the particular reactions or emotional responses. For example, user emotional response data may be stored in memory 308 of user equipment device 300 shown in FIG. 3, or uploaded to media guidance data source 418 shown in FIG. 4 through communications network 414. Control circuitry 304 or media guidance data source 418 may include processing circuitry for determining portions of a particular media asset that stimulated a particular emotional response from a particular group of users or all users who have agreed to share user emotional response data. Subsequently, control circuitry 304 or media guidance data source 418 may generate, from such determined portions, "group-recommended" or "population-recommended" graphical representations for download by individual user equipment devices. Alternatively, user reactions may be stored for a group of users and retrieved for analysis only when needed.

When option 510 is selected but a graphical representation based on the particular user's emotional responses to a particular media asset is not readily available locally or from a server, user equipment device 300 may check its local memory 308 or communicate with media guidance data source 418 to see if previously identified user emotional response data or user reaction data to the particular media asset from the particular user are available. If so, user equipment device 300 may retrieve and process such data to generate a graphical representation for display as media portion 520 in FIG. 5. Otherwise, a default media representation from the content provider, or a group-recommended or population-recommended media representation may be used.

Correspondingly, selection of option 512 allows a media guidance application to customize the media portion 520 of items in a program listing with group-recommended or population-recommended graphical representations. In generating such recommendations, correlation between different user profiles may be considered, matching the current user with groups of similar age, gender, and/or preferences towards particular genres, sub-genres and/or media contents. Option 512 may also be preferred when user equipment device 300 does not include sensing devices for capturing user reaction data.

Furthermore, selection of option 514 allows the media guidance application to use default media representations as provided by content providers and as received from media content source 416 or media guidance data source 418. Similar to option 512, option 514 may be preferred when user equipment device 300 does not include sensing devices for capturing user reaction data. Option 514 may also be preferred when privacy is of concern to the user, or energy use for signal processing is of concern to the system.

In some other embodiments of the present disclosure, option 514 may further allow the media guidance application to tailor multiple default media representations for a media asset according to user interests. Under such a setting, the content provider may provide a set of pre-defined graphical representations, each with associated meta-data that describes potential points of interest for the corresponding graphical representation. For example, an image of Iron Man flying in his armor may have meta data such as "gadgets," "armor," "superhero," "flight," and "artificial intelligence," while an image of Tony Stark standing on top of the Stark Tower with Pepper Potts may have meta data such as "superhero," and "romance." The media guidance application may cross-match such meta-data with user interests on media assets to select one of the pre-defined graphical representations for display in a media listing. Such meta-data may be manually assigned by the content provider, or generated automatically by analyzing a pre-defined graphical representation and recognizing characters or objects present. Object recognition techniques such as sharpness detection may be employed in this process. User interests on media assets may be collected directly from the user through user input interface 300. Furthermore, user interest data may be generated from past user emotional responses. For example, given a media asset, once portions of the media asset have been identified from user emotional responses, control circuitry 304 may further analyze the identified portions to generate meta-data like user interest preferences. Such user interest preferences may or may not be correlated with this particular media asset, or even any particular types of user emotional responses. In other words, a user showing any detectable emotion to a portion of any media asset may be a good indication of user interest in topics included in this portion of the media asset. A user who enjoys watching the armored superhero Iron Man flying at supersonic speed is likely to enjoy watching Batman speeding in his Batmobile as well. Moreover, in addition to or instead of the set of pre-selected images, other pre-defined graphic representations such as trailer clips may also be provided. Such default trailer clips may be further mixed by the guidance data application according to user interests as identified through past user emotional responses.

Control circuitry 304 may receive a user's update preference(s) via user selection of one of the user preference options, as illustrated by options 510, 512, and 514. For example, control circuitry 304 may receive the user selection of option 510. In response to receiving user selection of option 510 and option 530 to proceed to the next page, control circuitry 304 may instruct display 312 to show another screen configured to receive user input of an ID or a password, or other privacy or content access settings related to a customized media listing display.

In combination with user emotional responses, program attributes may become useful in identifying portions of a media asset for generating graphical representations. For example, the most memorable scene of an action movie is most likely an action sequence shown towards the end of the movie, and the action sequence is more likely to cause a viewer to be excited and attentive, with elevated heart rate and dilated pupils; a tragedy is likely to be remembered by the death of a character, and a dying scene is more likely to cause the viewer to be sad, with particular eye blink rate patterns and tears visibly present. Similarly, a thriller is likely to cause abrupt body movements and minute muscle contractions. In other words, given the genre and/or sub-genre of a media asset, certain types of user emotional responses are more indicative of whether the user is interested and focused on a particular portion of a media asset. Thus, a user emotional response selection criterion may depend on or include media attributes such as genres and subgenres, and characteristics of user emotional responses may accordingly be weighted differently in selecting portions of a media, as will be further discussed later in connection to FIGS. 8, 12 and 13.

Figure 6:
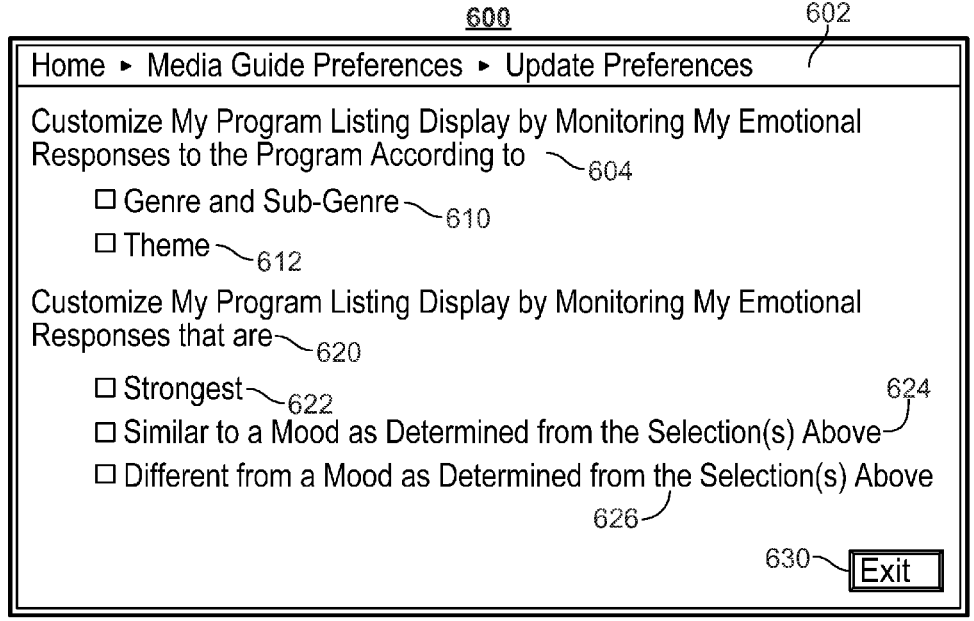
FIG. 6 is an illustrative screen showing options for providing customized media representations based on media attributes for display in a media listing in accordance with some embodiments of the disclosure.

FIG. 6 is an illustrative screen 600 showing options for customizing media representations based on media attributes for display in a media listing in accordance with some embodiments of the disclosure. Screen 600 may be displayed by the control circuitry 304 on display 312, in response to receiving a user selection of option 510 displayed on screen 500 and a user request 530 to proceed to the next page. Control circuitry 304 may also display screen 600 on display 312 in response to receiving user selections or other types of user inputs from media guide preference update pages similar to screen 500.

Title 602 and illustrative instruction 604 shown on screen 600 provide the user of user equipment device 300 with a context for providing update preferences by indicating to the user that the graphical representation of a media asset, corresponding to media portion 520 shown in screen 500, could be updated according to the user's emotional responses and media asset attributes. Illustrative examples of such program attributes are shown by options 610 (media genre and sub-genre) and 612 (media theme) in FIG. 6. Though FIG. 6 only shows two media attribute options 610 and 612, screen 600 may be populated with any number of media attributes. These media attribute options may include, but are not limited to, media genre (e.g., news, sports, movies, TV shows, music), media sub-genre (e.g., comedy, melodrama, tragedy, action, thriller), theme (e.g., honor, sacrifice, valor, defeat), media content type (e.g., war, western, legal, detective), media artistic status (e.g., art), target audience (e.g., children, young adult, adult, family), and media asset type (e.g., TV episode, a movie, a song, an album, etc.). The categorization of media attributes may vary in different embodiments of the present disclosure. When one or more options listed on screen 600 under instruction 604 are selected, control circuitry 304 takes into account selected media attributes in choosing user emotional responses for generating graphical representations for inclusion in a program listing. In other words, under this setting, the user emotional response selection criterion depends at least on attributes of the media asset of interest.

Illustrative instruction 620 shown on screen 600 indicates to the user of user equipment device 300 that the graphical representations in a program listing, media portion 520 shown in screen 500, could be updated in relation to a mood as determined from media attributes selected in response to instruction 604. As an example, if neither option 610 nor option 612 are selected, but option 622 is chosen, graphical representations would be generated from the strongest emotional response, regardless of media attribute. If option 610 and option 622 are selected, graphical representations would be generated from the strongest of a subset of emotional response as chosen according to media attribute. Under this setting, different types of emotional responses may be compared according to one or more characteristics such as duration or intensity of a media asset. Intensity of different types of emotional responses may be measured by distinct metrics such as loudness of a scream or amount of increase in heart rate. Emotional response analyzer 318 or control circuitry 304 may also normalize emotional response intensity for comparison across different types of emotional responses.

As a more specific example, if options 610 and 624 are selected, graphical representations would be generated from emotional responses with types similar to a mood as determined from the genre and sub-genre of a media asset. For instance, graphical representations for a comedy would be generated from portions of the media to which the user showed amusement through a smile or laughter, and graphical representations for a thriller would be generated from portions of the thriller to which the user showed fear or disgust through a scream or increased paleness of the skin. Similarly, if options 610 and 626 are selected to customize graphical representations according to emotional responses with types different from a mood as determined from the genre and sub-genre of the media asset, graphical representations for a comedy may be generated from portions of the media to which the user showed sadness. In this particular example, "different from" is considered equivalent to "opposition to," although other embodiments may define relationships as given in options 624 and 626 in some other distinct ways. If more than one emotional response is found to fall into a category as indicated by the selected options, one of such emotional responses may be chosen randomly for generating a graphical representation. Alternatively, these emotional responses may be ranked according to strengths as measured by durations and/or intensities, and the top one or top several emotional responses may be chosen for generating a graphical representation. In another example, all emotional responses that fall into the category as indicated by the selected options may be used in generating a graphical response.

In some embodiments, selecting one of options 622, 624 and 626 may automatically ban the selection of the other two choices. In some other embodiments, more than one of options 622, 624 and 626 may be selected, and user emotional responses that satisfy any of the three options may be pooled for generating graphical representations.

In this embodiment shown in FIG. 6, the update to media guide preferences is completed upon selection of exit button 630. In some other embodiments, in response to receiving a selection of option 610, control circuitry 304 may display another screen similar to screen 600, listing individual genres and/or sub-genres, for the user to further personalize by choosing particular genres or sub-genres of media assets according to which emotional responses should be selected for generating graphical representations. Moreover, control circuitry 304 may provide an additional screen to receive user input for turning on or off the function of monitoring user emotional responses, in combination with, for example, a dedicated on/off button on a remote control device.

In some embodiments, control circuitry 304 may store the selection received through screen 500, 600, and other similar media guide preference updates in volatile storage as part of storage 308 so that control circuitry may more quickly fetch the stored selection at a later time. In other embodiments, control circuitry 304 may store the selection in nonvolatile storage as part of storage 308 so that they will persist even when media equipment device 300 loses power. In yet other embodiments, control circuitry 304 may upload the selection to a remote server for sharing among other devices owned by the same user, or owned by members of a group designated by the user.

Figure 7:
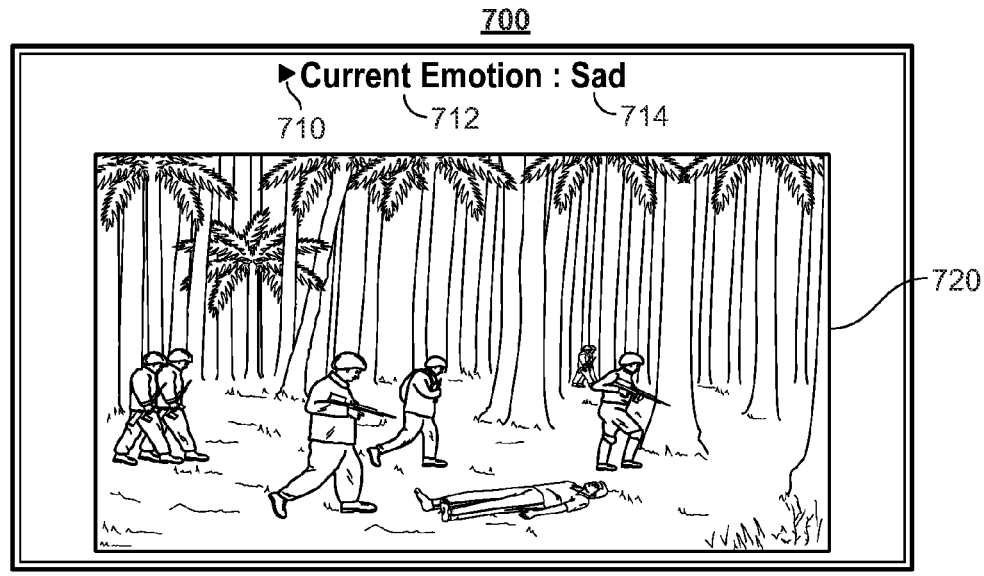
FIG. 7 is an illustrative screen showing a video media asset when a user emotional response is detected in accordance with some embodiments of the disclosure.

FIG. 7 is an illustrative screen showing a video media asset when user reactions are monitored and a user emotional response is identified in accordance with some embodiments of the disclosure. In response to receiving a selection of option 510 on screen 500 and other additional user preferences in relation to media listing customization, control circuitry 304 initiates sensing device 316 in user input interface 310 to collect user reactions as media asset 720 is presented on screen 700. Media asset 720 can be a broadcast program, recorded video, streaming content, or other types of media content. To notify the user that user reactions are being monitored, user equipment 300 may have a dedicated indicator such as an LED turned on whenever the monitoring function is on. Alternatively or in combination, an overlay display may be shown on screen 700, with an arrow-shaped monitoring state indicator 710 indicating that the monitoring function is on.

As discussed in connection to user input interface 310 and control circuitry 304 shown in FIG. 3, in this disclosure, the term user reaction refers to user physical, physiological, and neurological responses that can be extracted from measurements by sensing device 316, while the term user emotional response refers to a user's emotional state, as identified from user reaction data by emotional response analyzer 318, or actively inputted by the user through user input interface 310. Sensing device 316 may include one or more image and video capturing devices such as still image cameras, video cameras, thermographic cameras, and other types of image capturing devices capable of extracting facial expressions, eye movements, head and body motions, in conjunction with voice, audio, and speech. Sensing device 316 may also include, but is not limited to, wearable motion, physiological, and neurological sensing devices such as accelerometers, gyroscopes, multisensors, electroencephalograph sensors, electrocardiograph sensors, electromyograph sensors, heart rate and blood pressure monitors, and passive infrared or tomographic motion, brainwave, and body temperature detectors that do not need to be worn directly by the user. Furthermore, sensors for measuring ambient light intensity and background noises may be employed for calibrating captured image, audio, and video data.

When turned on, sensing device 316 monitors changes in the user's physical, physiological and neurological states as indicators of the user's emotional state. For example, a dilated pupil, an elevated heart rate, or a particular electroencephalograph pattern may indicate that the user is excited; faster blinking patterns may indicate that the user is on the verge of crying thus is sad, and an increase in the user's facial temperature may indicate the user is flushing, thus embarrassed or angry. A voice recognition system may further identify if the user cursed, screamed, or sobbed while a media asset is presented. Captured image and video data and sensed motion data may be analyzed to determine if the user is covering his or her eyes in fear, if the user is smiling in happiness, or if the user is throwing up his or her arms in despair. Emotions that may be derived from user reactions include, but are not limited to, agitation, amusement, anger, annoyance, astonishment, attentiveness, boredom, calmness, disappointment, disgust, fear, grief, indifference, nervousness, rage, sadness, surprise, and terror.

There are various ways to derive user emotional responses from monitored physical, physiological, and neurological reactions. In one example, emotional response analyzer 318, either implemented as a distinct hardware module or as a software module executed through control circuitry 304, first compares appropriate functions of sensor measurements with reference values to extract and quantify user reactions. Such reference values may include, depending on the sensor type, user reaction types, user reaction extraction features, and user reaction extraction thresholds. Reference values may be tabulated and stored in a local reaction database implemented in emotional response analyzer 318 or control circuitry 304, or in a remote reaction database implemented by guidance data source 418.

As an illustrative example, consider a smartphone as user equipment device 300. Sensing device 316 may include a front facing camera as an image sensor, a microphone as a sound sensor, and a muscle contraction monitoring belt connected to the smartphone through Bluetooth, as a muscle contraction sensor. Emotional response analyzer 318 may separately consider measurements from each of the three sensors. Upon determining the first sensor is an image sensor, emotional response analyzer 318 retrieves from the reaction database types of reactions (e.g., a laugh or a frown) and reaction features (e.g., curvatures of the eyes and the lips). Accordingly, emotional response analyzer 318 performs an initial facial feature extraction function to locate the eyes and the mouth, and track changes in the curvatures of the eyes and the lips. By comparing the measured changes in the curvatures of the eyes and the lips with one or more threshold values retrieved from the reaction database, emotional response analyzer 318 can determine the start time, the end time and the degree of a laugh or a frown. Similar analysis can be performed on audio data measured through the microphone to determine the start time, the end time and the loudness of laughter, and on muscle-contraction data measured through the belt to determine the start time, end time and the degree of a laugh. Emotional response analyzer 318 may further compare and combine reactions extracted from different sensor data according to a pre-defined rule stored in the reaction database to determine the type, degree, and other characteristics of the derived reactions. Furthermore, emotional response analyzer 318 compares, individually or in combination, the determined type, degree, and other aspects of the derived reactions with pre-determined ranges retrieved from the reaction database to determine the types and characteristics of emotional responses present. In this example, emotional response analyzer 318 may determine that the user is very amused, the amusement lasted for 30 seconds from the onset of a laugh to the end of a laugh, and the amusement is extensive since a particular curvature threshold of the lips was exceeded.

As discussed in the example above, in addition to the types of user reactions, sensing device 316 may record start and end times, and other characteristics of user reactions for defining characteristics of user emotional responses. For example, the onset and termination of laugh may be recorded and correlated to determine the duration of the user's amusement in response to a portion of a media asset. Similarly, the volume of the user's scream may indicate the extent to which he or she has been surprised or startled. Characteristics such as duration and intensity may be viewed as strength indicators for user emotional responses. Emotional responses of approximately the same type (e.g., anger and rage, grief and sadness, or pleasure, happiness, and amusement) may be directly compared through similar emotional response characteristics, while emotional responses of very different types (e.g., anger and amusement) may be compared quantitatively by weighting different characteristics of an emotional response and/or different characteristics of corresponding user reactions to obtain a reaction score, which may be normalized and compared.

To select one or more identified user emotional responses for determining portions of a media asset that may be of interest to a user, emotional response analyzer 318 may first retrieve a user emotional response selection criterion from a emotional response database, where the emotional response database is implemented together and cross-referenced with the user reaction database, or implemented separately from the user reaction database. When the emotional response selection criterion is to choose the strongest emotional response, emotional response analyzer 318 may rank the strengths of all identified user emotional responses and select the strongest one for graphical representation generation. Such strengths may be measured by a reaction score computed according to emotional response types and characteristics. For example, the strength of a laughter may be measured by a unitless reaction score computed as the ratio of the loudness of the laughter to a pre-determined normalization factor retrieved from the user reaction database or the user emotional response database. The emotional response selection criterion may also explicitly provide a threshold on user reaction scores, where all emotional responses with scores higher than the threshold are selected for graphical representation generation.

Returning to FIG. 7, in addition to the monitoring state indicator 710, a current state display 712 and a captured state display 714 may be shown on screen 700 to indicate the currently captured user reaction or user emotional response. In this embodiment, the current state display 712 and captured state display 714 show that the current emotion of the user as derived from detected user reactions is sadness. Captured states may be described by terms such as "happy," "surprised," "scared," "irritated," or "disgusted" in the captured state display 714. Alternatively, the captured state display 714 may show the user's current reactions such as "crying," "laughing," "blushing," or "elevated heart rate," with current state display 712 updated accordingly to describe the content of captured state display 714. Current state display 712 and captured state display 714 may even show measured physiological states, such as values of the current heart rate, current respiration rate, or current frequency of arm movements.

Figure 8:
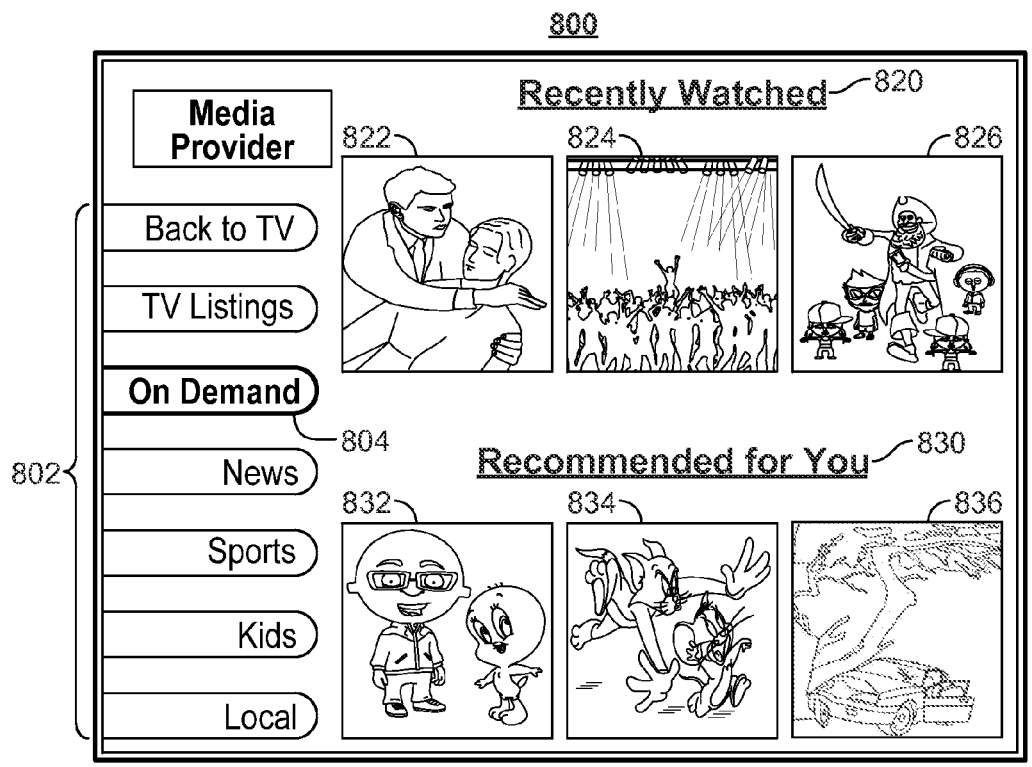
FIG. 8 is an illustrative media asset listing including graphical representations generated according to user emotional responses captured during media asset playback, in accordance with some embodiments of the disclosure.

FIG. 8 is an illustrative program listing generated according to user emotional responses captured during media asset playback, in accordance with some embodiments of the disclosure. The video mosaic display 800 includes selectable options 802 for content information organized based on content type, genre, and/or other organization criteria. In display 800, on-demand listing option 804 is selected, thus providing listings 820 for recently watched media assets, and listing 830 for recommended media assets. In this example, the graphical listing 820 includes graphical representations 822, 824, and 826 for three different movies, and graphical listing 830 includes graphical representations 832, 834, and 836 for three other movies.

In the embodiment shown in FIG. 8, graphical representations are generated according to the strongest user emotional responses to media assets in listings 820 and 830. Graphical representation 822 shows a main female lead dying in a main male lead's arms, for which the user, while recently watching the movie, has cried for the longest period of time; graphical representation 824 shows a concert scene, for which the user has waved his arms for a longest period of time while watching the movie; graphical representation 826 shows a funny scene for which the user laughed most loudly while recently watching the movie. By providing graphical representations 822, 824, and 826 that reflect the user's strongest emotional response to each of the three media assets in list 820, the user is better reminded of the plot of each movie, and more importantly, is better reminded of the feelings experienced while watching these media assets. As a result, the user can better choose a desirable media asset.

In another embodiment of the recently watched listing 820, graphical representations are generated according to the strongest user emotional responses with types that are similar in mood to an attribute of the media assets in listing 820. For example, if the media attribute under consideration is sub-genre, graphical representation 822 may still show the dying scene if the corresponding media asset is a melodrama, and if the user has cried the hardest and the longest while watching this particular scene. However, graphical representation 824 may show a farewell scene instead of the concert scene, if the corresponding media asset is a tragedy, and if the user has cried while watching the farewell scene. In other words, even though the overall strongest user emotional response is excitement and happiness, since the media asset is a tragedy with a sad mood, only emotional responses with similar types are considered when identifying portions of the media for graphical representation generation. Similarly, graphical representation 826 may show the same funny scene if the corresponding media asset is a comedy, or a different, sad scene if the corresponding media asset is a tragedy.

In yet another embodiment of the recently watched listing 820, graphical representations are generated according to the strongest user emotional responses with types that are different in mood from an attribute of the media assets in listing 820. For example, emotional responses with types opposite to a mood as identified by a media attribute may be used. If the media attribute under consideration is sub-genre, graphical representation 822 may show the dying scene if the corresponding media asset is a comedy, graphical representation 824 may show the farewell scene if the corresponding media asset is a comedy, and graphical representation 826 may show the funny scene if the corresponding media asset is a tragedy.

Listing 830 shows media assets that have not been viewed by the user, but is recommended to the user by the media guidance application. While conventional recommendation criteria such as user preferred genres, cast, or director/producer can be used to select which media assets are shown in the list, graphical representations for such recommended media assets 832, 834, and 836 shown in listing 830 may be determined according to other users' emotional responses, collected from those who have agreed to share their data with other users in the system. In this example, graphical representations 832 and 834 are composed of comic scenes to which many users with preferences similar to the current user's preferences have shown an amused response, while graphical representation 836 is composed of a tragic scene to which many users with preferences similar to the current user's preferences have shown a sad response, all with the intent of drawing the user's attention in accordance to the genre or sub-genre of the media asset.

Once one or more portions of a media asset have been identified according to a selected user emotional response, graphical representations may be generated by control circuitry 304 from the identified portions in various ways. In one embodiment, the graphical representation is a single frame randomly captured from the identified portion; in another embodiment, the graphical representation is a single frame corresponding to the moment when the user showed the most intense or strongest emotional response; in yet another embodiment, the graphical representation is a collage of a plurality of frames captured from the one or more portions of the media, or a collage of characters that have appeared in the one or more portions of the media. Similarly, the graphical representation can be a trailer clip generated as a sequence of frames identified from the portion of the media. When presented in a media listing, a trailer clip may be looped indefinitely, with or without audio output.

As an illustrative embodiment of the system and methods shown in this disclosure, in the following paragraphs, the process of generating a graphical representation according to the strongest user emotional response shown by the user is described.

Upon initialization, a media guidance application may default to using graphical representations from the content provider. Thus, media listings such as listings 820 and 830 in FIG. 8 are presented with default graphical representations as provided by corresponding content providers. For example, a default graphical representation may be a title frame extracted from the title sequence as during a TV program broadcast. A graphical representation of The Simpsons may be the iconic image of the Simpson family sitting on a couch, while a graphical representation of the Batman movie may be an image of Bruce Wayne in his Batman suit standing in front of a burning building.

The guidance application, as implemented in systems shown in FIGS. 3 and 4, provides the user with an option to customize a media listing display with user emotional responses, as discussed in connection to FIGS. 5 and 6. For example, the user may choose to customize media listings shown by the media guidance application by monitoring his or her emotional responses, and may also update his media listing customization preferences to indicate that graphical representations should be generated according to the strongest emotion shown when a media asset is presented to the user.

Upon user selection of options to customize media listings, as discussed in connection with FIG. 3, sensing devices are turned on when a media asset is presented to the user, for measuring physical, physiological, or neurological reactions shown by the user during playback. For example, as the user selects the Batman movie from an on-demand list for playback on a television, sensing devices such as a video camera mounted on the television, and a Bluetooth wristband heart-rate monitor worn by the user may be powered on. As the movie is played, the video camera continuously captures images of the area in front of the television, and the wristband heart-rate monitor captures the pulses of the user.

Measurements from each sensing device are sent to a dedicated emotional response analyzer for analysis. The emotional response analyzer identifies user reactions as captured through the measurements according to different sensor types. For example, provided that the video camera is an imaging device, the emotional response analyzer may retrieve, from a user reaction database, reaction types and reaction features that may be extracted from captured images. Such reaction types may be particular facial expressions such as a smile or a frown, or particular eye properties such as blink rate and pupil size. Corresponding reaction features to extract may include changes in the curvatures of the eyes and the lips, changes in the size of the pupil and changes in the blink rate. By performing face recognition and facial feature extraction and tracking on successive frames of captured video data, the emotional response analyzer determines the presence, the start time, end time, and extent or intensity of a particular reaction. For example, increases in the curvatures of the eyes and the lips indicate the onset of a smile, while a subsequence decrease in the curvatures indicates the termination of a smile.

Once user reactions are identified from measurements collected from individual sensing devices, the emotional response analyzer processes identified user reactions individually or collectively to determine the presence and characteristics of different user emotional responses. For example, a smile with large eye curvatures may indicate a strong amused response, while pupil dilation with a large increase in pulse rate may indicate strong attentiveness and excitement. The emotional response analyzer may quantify characteristics of emotional responses such as intensity with a normalized reaction score, as discussed in connection with FIG. 8. The emotional response analyzer may also compute an overall reaction score for an emotional response by weighting different characteristics of the emotional response, with weights dependent on the type of the emotional response.

Analysis of sensor measurements and user reaction data may occur while a media asset is played. Alternatively, analysis may occur after media playback to reduce potential system conflict with tuning and decoding operations by the user equipment device.

Once playback terminates and user reaction data are processed, the emotional response analyzer compares identified user emotional responses to a user emotional response selection criterion that may be retrieved from a user emotional response database. The user emotional response selection criterion may depend on types of emotional responses and attributes of the media asset of interest. In the Batman movie example, the user selection criterion is to choose the strongest emotional response, regardless of response type. Accordingly, the emotional response analyzer may compare identified user emotional responses by examining associated reaction scores indicative of the strengths of user emotional responses.

After the emotional response analyzer identifies the strongest user emotional response, the corresponding portion of the on-demand recording that stimulated this particular user emotional response is retrieved from memory. For example, the user may show sadness when Rachel Dawes dies, and excitement when Batman races down the street of Gotham in chase of the Joker. Comparison between the two emotional responses may show that the former was more intense, thus should be used for generating a graphical representation of the Batman movie. A control circuitry such as discussed in connection to FIG. 3 may correspondingly retrieve the chase scene from memory.

To generate a graphical representation from the chase scene, the control circuitry may create a collage of a predefined number of frames randomly extracted from the scene. The generated graphical representation is then stored in memory or uploaded to a user-specific database, for later presentation in a media listing that includes the Batman movie.

Figure 9:
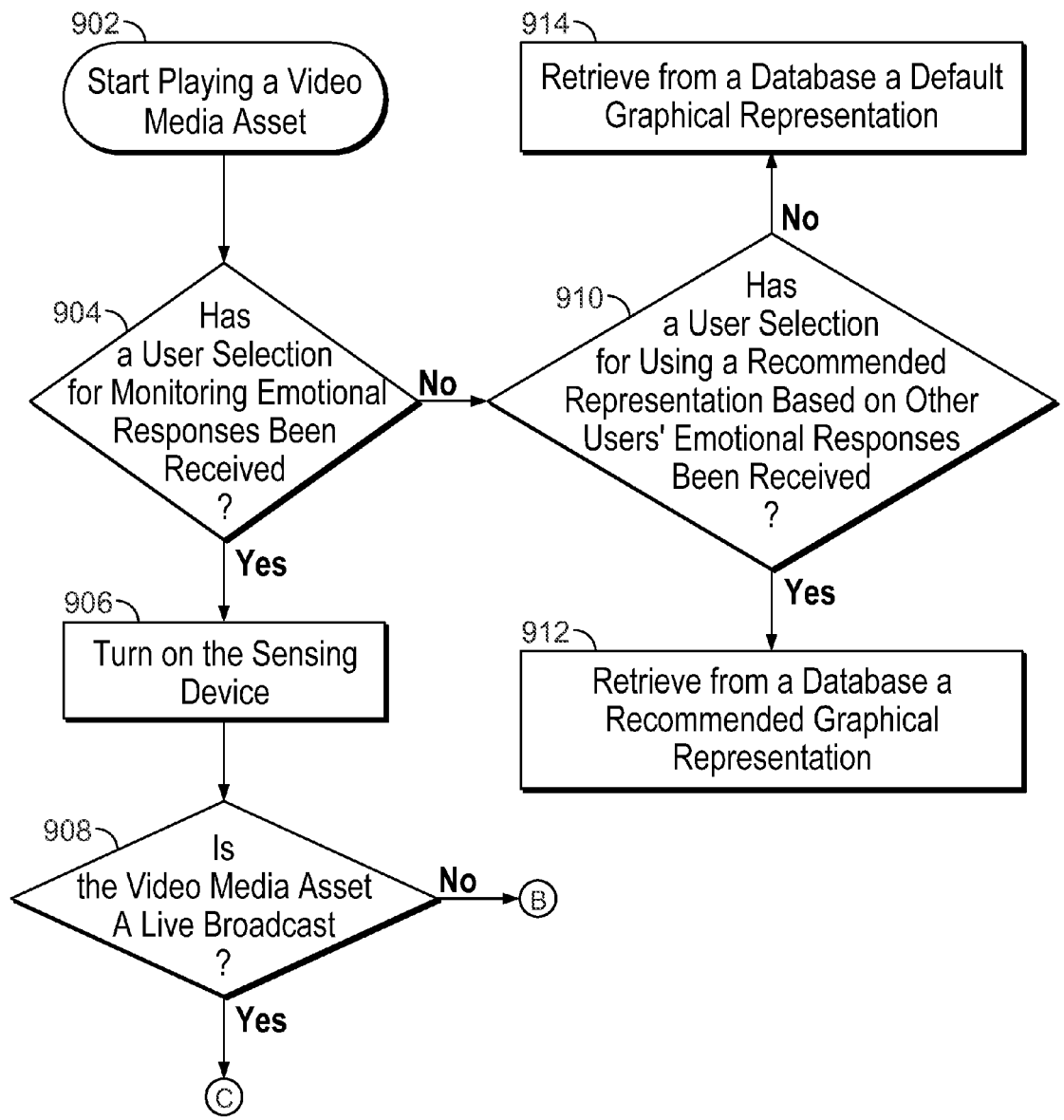
FIG. 9 is a flowchart of the illustrative steps involved in using a default graphical representation in accordance with some embodiments of the disclosure.
Figure 10:
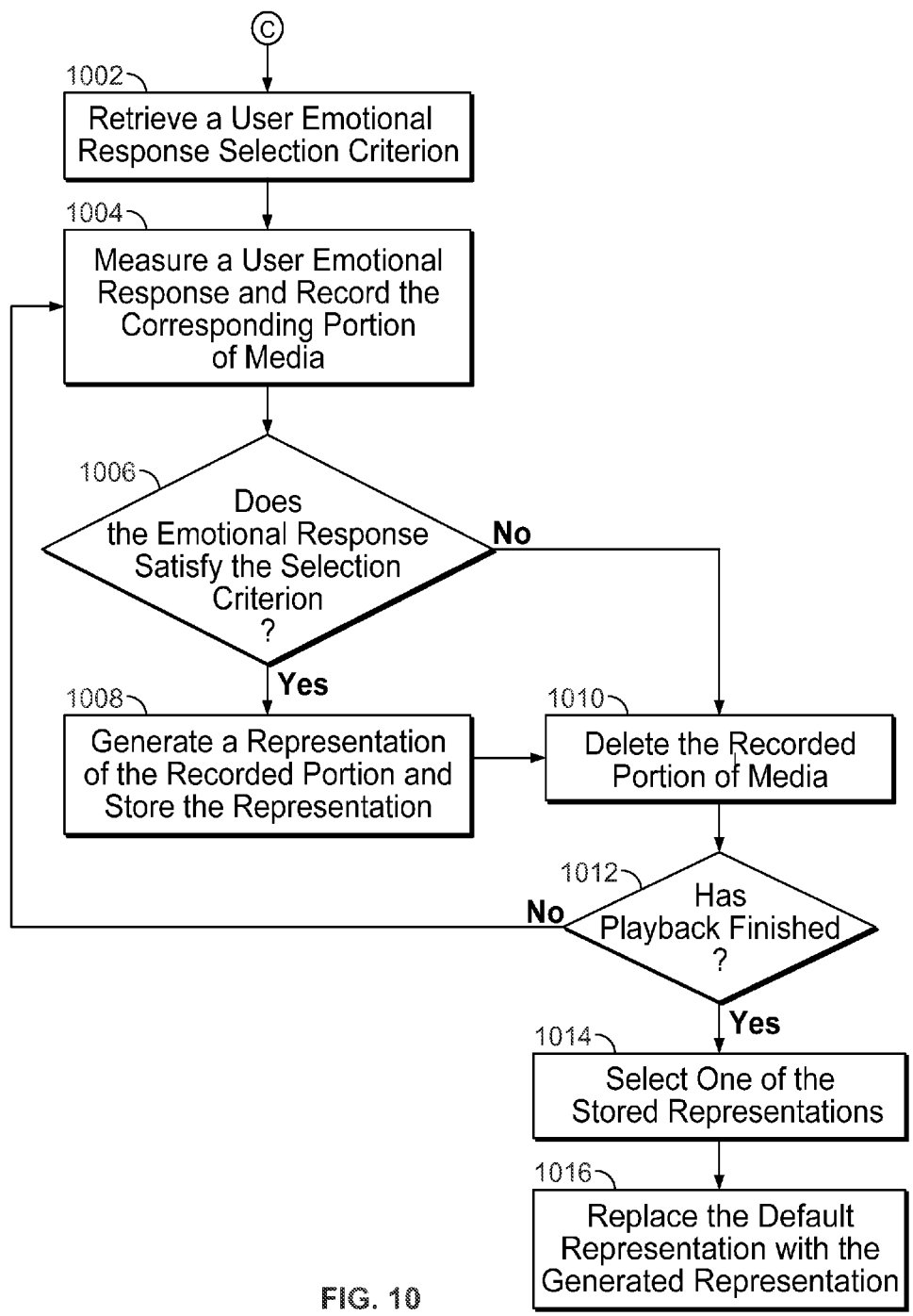
FIG. 10 is a flowchart of the illustrative steps involved in generating a representation of a video media asset delivered through a live broadcast in accordance with some embodiments of the disclosure.

FIG. 9 is a flowchart of the illustrative steps involved in using a default graphical representation or a group-recommended or population recommended graphical representation in accordance with some embodiments of the disclosure. FIG. 10 is a flowchart showing steps involved in generating a representation of a video media asset delivered through a live broadcast in accordance with some embodiments of the disclosure. The steps shown in FIGS. 9 and 10 may be applicable in situations where a user of device 300 has specified, via screen 600, update preferences to customize graphical representations for media assets based on user emotional responses but not media attributes such as genres. These steps are discussed in detail below.

In step 902, control circuitry 304, as discussed in connection with FIG. 3, starts playing a media asset on the display 312. Next, control circuitry 304 checks at step 904 if a user selection for monitoring emotional responses has been received from the user, as discussed in connection to FIG. 5. If the user has not requested a media listing to be customized, control transfers to step 910. Control circuitry 304 checks at step 910 if a user selection for using a recommended representation based on general audience reaction has been received. If not, control transfers to step 914, and control circuitry 304 provides a default graphical representation to the media listing. Otherwise, control transfers to step 916, and control circuitry 304 retrieves from a remote or a local database a recommended graphical representation for insertion into a media listing, as discussed in connection to FIG. 5.

At step 904, if a user selection for monitoring emotional response has been received, control circuitry 304 turns on sensing device 316 at step 906. Next, the media asset is checked to see if it is a live broadcast, or a recording. Live broadcast and recording are considered separately because a live broadcast may require additional memory for recording portions of the media asset for later generation of graphical representations, while only references to portions of the media asset are needed if the media asset is an existing recording. A live broadcast may also include live streaming of media content, or any download of media content from a remote location.

Upon determining that the media asset is a live broadcast at step 908, control circuitry 304 retrieves a user emotional response selection criterion from a user emotional response database at step 1002, in FIG. 10. Such a user emotional response selection criterion may be stored locally in memory 308 of user equipment device 300, or remotely at media guidance data source 418.

As discussed in connection to FIGS. 7 and 8, a user emotional response selection criterion may be as simple as a type of the user emotional response, for example, whether the user cried, laughed, or was indifferent to the media shown. The user emotional response selection criterion may also include intensity and/or duration of user emotional responses, for identifying the strongest user emotional response. In more advanced embodiments, the selection criterion may take into account, in addition to the type and intensity of monitored emotional responses, media asset attributes such as genre and theme, and individual user profiles such as age, gender, and other viewing preferences. Characteristics of an emotional response may be quantified by a reaction score specific to each type of user emotional response. For example, the intensity of a user emotional response may be measured differently depending on the type of the response, where a short but loud scream may be considered as intense as a low, but long sob. A user reaction score may also be calculated from multiple characteristics of a user emotional response, where the weight for each characteristic may vary depending on the type of the emotional response and attributes of the media asset under consideration. The assignment of reaction scores to each emotional response facilitates the comparison among different types of responses.

Once the user emotional response selection criterion is retrieved at step 1002, control circuitry 304 enters a monitoring mode at step 1004, to detect and measure a user emotional response, while recording the corresponding portion of the media asset. As discussed in connection to FIGS. 7 and 8, the process of detecting a user emotional response is not trivial, and may involve sensor measurement processing and calibration to obtain reaction data, and further analysis of reaction data to characterize different emotional responses. Once control circuitry 304 determines an emotional response has ended (e.g., the user has stopped crying), control transfers to step 1006 to determine if the detected emotional response satisfies the user emotional response selection criterion. When the decision is affirmative, a graphical representation of the recorded portion is generated and stored in memory at step 1008, for later inclusion in a media listing. Otherwise the recoding of the media portion corresponding to the identified emotional response is removed at step 1010, and the control circuitry 304 returns to monitoring user emotional responses at stop 1004, until it is determined that playback has finished at step 1012.

Upon termination of playback at step 1012, control transfers to step 1014 to select one of the stored graphical representations to replace the default graphical representation at step 1016. In cases where the existing graphical representation was also generated according to user emotional responses, the graphical representation is updated at step 1016 with the newly generated one. For example, new graphical representations may be generated during each episode of a TV show, and a media listing may be updated periodically with such new graphical representations, which reflect user emotional responses to the latest episode of the show.

Figure 11A:
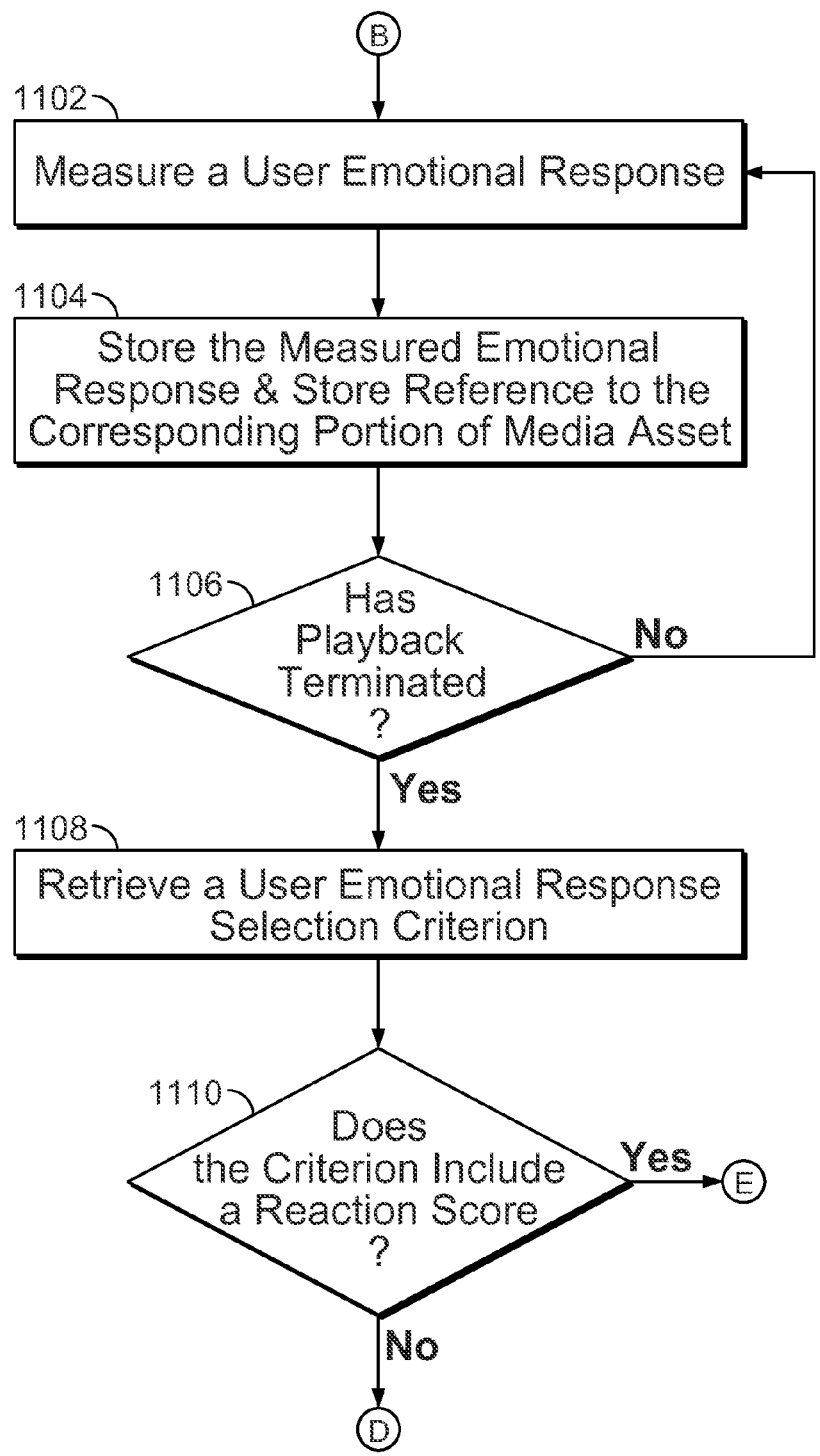
FIG. 11A and FIG. 11B show a flowchart of the illustrative steps involved in generating a representation of a recorded video media asset in accordance with some embodiments of the disclosure.
Figure 11B:
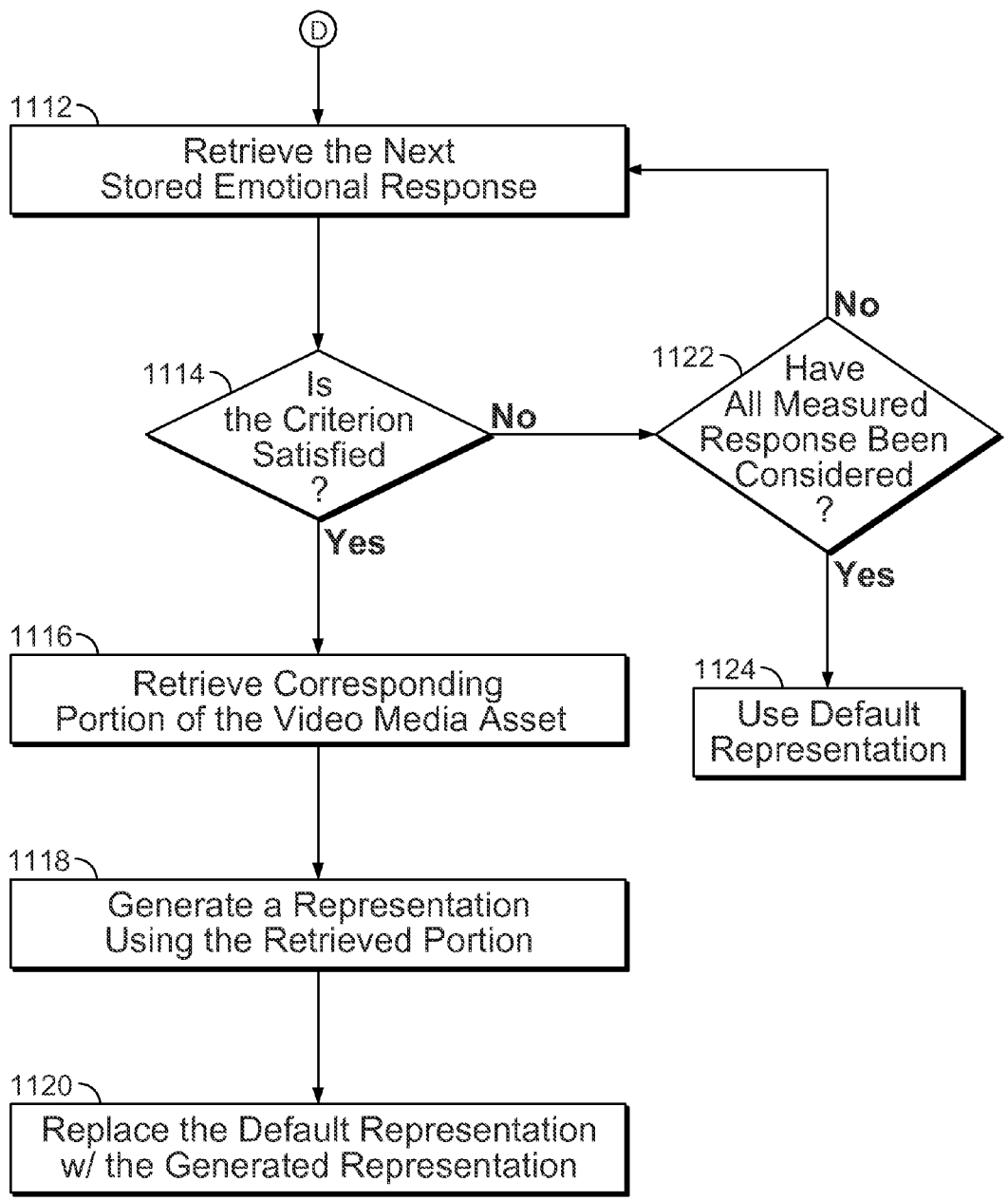

FIG. 11A and FIG. 11B show a flowchart of the illustrative steps involved in generating a representation of a recorded video media asset in accordance with some embodiments of the disclosure. The steps shown in FIG. 11A and FIG. 11B may be applicable in situations where a user of device 300 has specified, via screen 600, update preferences to customize graphical representations for media assets for inclusion in program listings. These steps are discussed in detail below.

At step 908 of FIG. 9, upon determining that the media asset is a recorded program, control transfers to step 1102 in FIG. 11A, where a user emotional response is measured. At step 1104, the measured emotional response is stored in memory, together with one or more references to the corresponding portion of the media asset. The process repeats, until control circuitry 304 determines at step 1106 that playback of the media asset has terminated. At step 1108, a user emotional response selection criterion is retrieved from a database located on a remote or a local server. At step 1110, control circuitry 304 determines if the user emotional response selection criterion involves reaction scores. If the selection criterion is determined not to involve reaction scores, control transfers to step 1112, otherwise control transfers to step 1202 in FIG. 12, or step 1302 in FIG. 13.

At step 1112 in FIG. 11B, the next stored emotional response is retrieved from memory, and compared to the emotional response selection criterion in step 1114. If the decision is affirmative, the corresponding portion of the video media asset is retrieved at step 1116, and a graphical representation of the retrieved portion is generated at step 1118. The default representation is subsequently replaced at step 1120 by the newly generated representation for display in a program listing.

When the emotional response selection criterion is not satisfied at step 1114, control circuitry 304 determines whether all measured emotional responses have been considered at step 1122. If all measured emotional responses have been exhausted, the default graphical representation is used in media listings at step 1124. Otherwise, control transfers back to step 1112 for examining the next stored emotional response.

Figure 12:
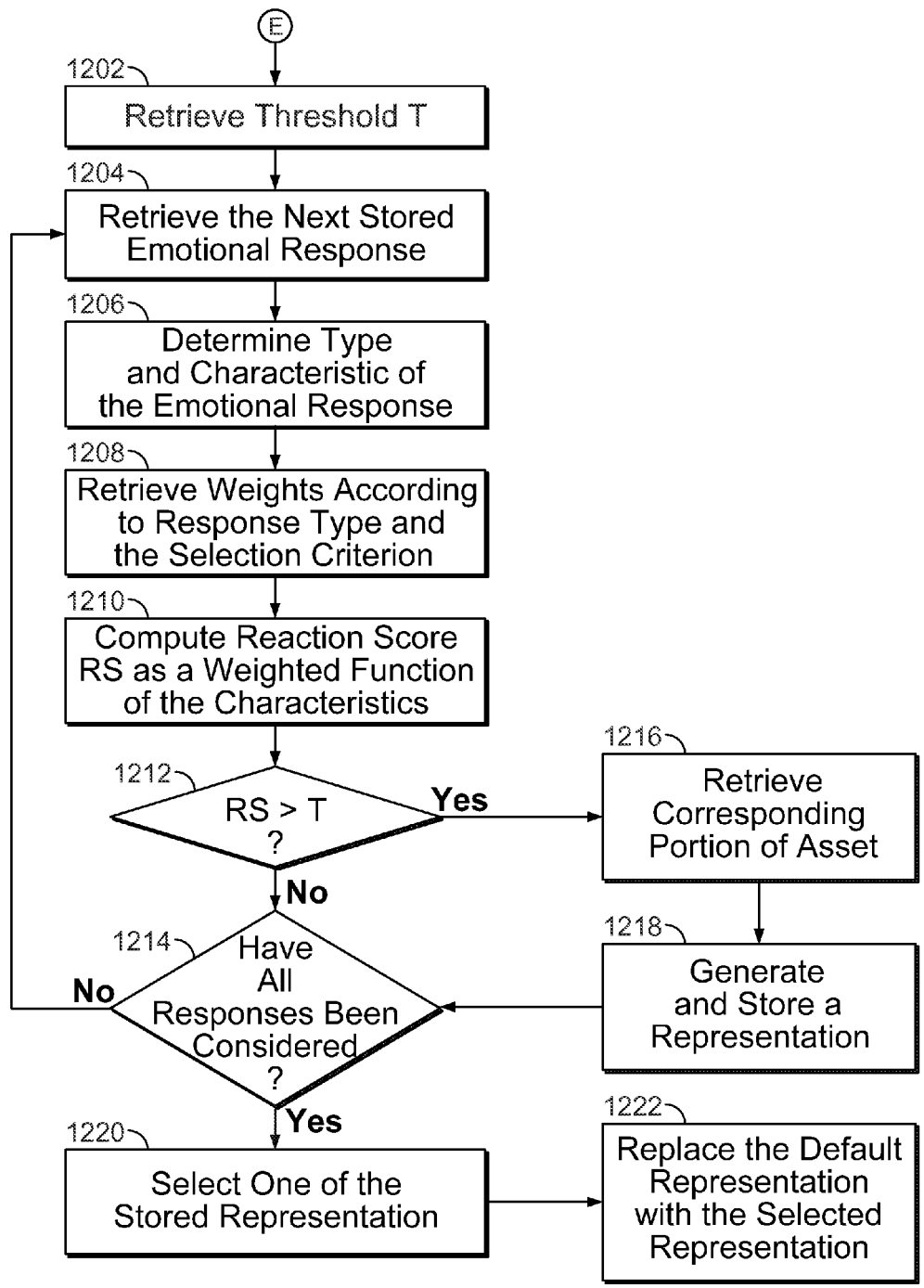
FIG. 12 is a flowchart of the illustrative steps involved in generating a representation of a recorded video media asset when the user emotional response selection criterion includes a reaction score, in accordance with some embodiments of the disclosure.

FIG. 12 is a flowchart of the illustrate steps involved in generating a representation of a recorded video media asset when the user emotional response selection criterion includes a reaction score, in accordance with some embodiments of the disclosure. In this embodiment, a pre-defined threshold T is retrieved from memory at step 1202. Control circuitry 304 then retrieves from memory the next stored emotional response at step 1204, and determines the type and characteristics of the emotional response at step 1206. According to the identified type of the emotional response and/or the user emotional response selection criterion, a set of weights is retrieved from memory by control circuitry 304 at step 1208, and a reaction score RS is computed as a weighted function of the characteristics at step 1210. The weighted function may be linear or non-linear. The calculated reaction score RS is compared to threshold T at step 1212 to determine if RS exceeds the pre-defined threshold. If the decision is affirmative, control transfers to step 1216, where the corresponding portion of the video media asset is retrieved, for generating a graphical representation at step 1218. The generated graphical representation is also stored in memory at step 1218. The process continues at step 1214, until all stored emotional responses have been considered.

Once all stored emotional responses have been considered, control circuitry 304 retrieves from memory one of the stored graphical representations at step 1220, to replace the default graphical representation at step 1222. The selection of one of the stored graphical representations at step 1220 may be made randomly, or according to some pre-defined rules.

Figure 13:
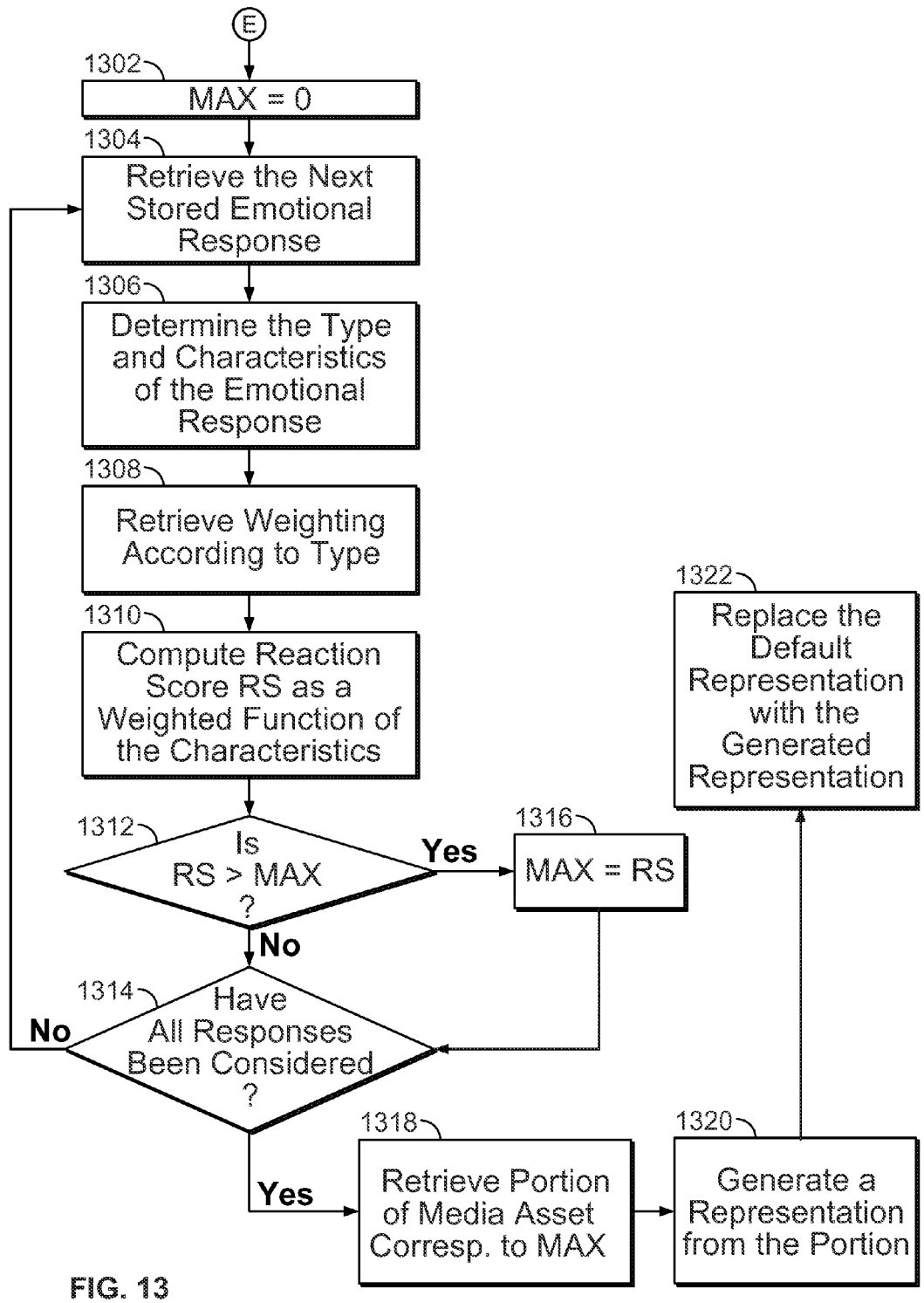
FIG. 13 is a flowchart of the illustrative steps involved in generating a representation of a recorded video media asset when the user emotional response selection criterion includes a reaction score, in accordance with some other embodiments of the disclosure.

FIG. 13 is a flowchart of the illustrative steps involved in generating a representation of a recorded video media asset when the user emotional response selection criterion includes a reaction score, in accordance with some other embodiments of the disclosure. In this embodiment, a maximum reaction score MAX is set to 0 at step 1302. Control circuitry 304 retrieves from memory the next stored emotional response at step 1304, and determines the type and characteristics of the emotional response at step 1306. Sample characteristics of an emotional response include duration and intensity of the response. According to the identified type of the emotional response and/or the user emotional response selection criterion, a set of weights are retrieved from memory by control circuitry 304 at step 1308, and an overall reaction score RS for the emotional response is computed as a weighted function of the characteristics of the emotional response at step 1310. The weighted function may be linear or non-linear. The calculated reaction score RS is compared to MAX at step 1312 to determine which one is larger. If RS is larger than the current value of MAX, control transfers to step 1316, where the value of MAX is replaced with the value of RS. Otherwise control transfers to step 1314, and the process is repeated until all stored emotional responses have been considered. At step 1318, the portion of media asset corresponding to the value of MAX is retrieved from memory, and a graphical representation is generated at step 1320 for replacing the default representation at step 1322.

In more advanced embodiments, the graphical representation could be generated according to multiple portions of the media asset, each corresponding to a particular emotional response that has satisfied an emotional response selection criterion. For example, different shots of Batman fighting the villains in his Batmobile can be made into a single collage or a single montage.

The above-described embodiments of the present disclosure illustrate the process of generating graphical representations from portions of a media asset to which a user has shown particular and strong interests. In some other embodiments of the present disclosure, graphical representations may also be generated from portions to which a user has shown less or little interest. In other words, the emotional response selection criteria as described above may limit the types of emotional responses considered to a subset including indifference, boredom, calmness, and others indicative of less interest or a lack of interest. In addition, emotional responses with lower reaction scores may be chosen for generating graphical representations. When graphical representations thus generated are listed together with those that reflect strong user interest, the user is more likely to pick the latter ones for viewing. Such a setup may be desirable when media assets from the same list are associated with different prices or different advertising fees, and graphical representations that reflect high user interests are only generated for media assets under promotion.

The above-described embodiments of the present disclosure are presented for purposes of illustration and not of limitation, and the present disclosure is limited only by the claims which follow.

What is claimed is:

1. A method for generating a representation of a video media asset for inclusion in a media asset listing for the video media asset, comprising:
   monitoring, using a processor, user emotional responses that occur while the video media asset is presented to a user;
   retrieving, from a storage device, a user emotional response selection criterion that corresponds to the video media asset, wherein the retrieving comprises:
      identifying an attribute of the video media asset;
      comparing the identified attribute with user emotional response selection criteria stored in the storage device; and
      retrieving the user emotional response selection criterion associated with the attribute;
   determining, for each monitored user emotional response, a type of the user emotional response;
   determining at least one mood associated with the identified attribute;
   searching the monitored user emotional responses for a given monitored user emotional response based on the retrieved user emotional response selection criterion and for which the determined type is similar to or different from the determined at least one mood;
   identifying which portion of the video media asset was presented to the user when the given user emotional response occurred; and
   generating, for the video media asset, a representation of the identified portion for inclusion in a media asset listing for the video media asset.

2. The method of claim 1, further comprising:
   determining, for each monitored user emotional response, characteristics of the user emotional response;
   computing, for each monitored user emotional response, a user reaction score as a function of the determined characteristics; and
   ranking the user reaction scores of the monitored user emotional responses,
   wherein the user emotional response selection criterion includes user reaction scores.

3. The method of claim 2, wherein the characteristics of a user emotional response include at least one of duration and intensity of the user emotional response.

4. The method of claim 2, further comprising:
   determining, for each monitored user emotional response, the type of the user emotional response; and
   retrieving from the storage device a set of weights according to the determined type of the user emotional response,
   wherein the user reaction score is computed as a weighted function of the characteristics of the user emotional response using the retrieved set of weights.

5. The method of claim 4, wherein the type of the user emotional response is selected from the group consisting of agitation, amusement, anger, annoyance, astonishment, attentiveness, boredom, calmness, disappointment, disgust, fear, grief, indifference, nervousness, rage, sadness, surprise, and tenor.

6. The method of claim 1, wherein the attribute is selected from the group consisting of genre, sub-genre, setting, theme, content type, artistic status, and target audience.

7. The method of claim 1, further comprising replacing a graphical representation of the video media asset previously selected by a content provider with the generated representation of the identified portion of the video media asset, wherein the generated representation of the identified portion is graphical.

8. A system for generating a representation of a video media asset for inclusion in a media asset listing for the video media asset, comprising:
   a plurality of sensors for measuring information related to user emotional responses that occur while the video media asset is presented to a user;
   a storage device for storing user emotional response selection criteria; and
   a processor in communication with the plurality of sensors and the storage device, configured to:
      monitor user emotional responses;
      retrieve, from the storage device, a user emotional response selection criterion that corresponds to the video media asset, wherein to retrieve the user emotional response selection criterion, the processor is further configured to:
         identify an attribute of the video media asset;
         compare the identified attribute with user emotional response selection criteria stored in the storage device; and
         retrieve the user emotional response selection criterion associated with the attribute;
      determine, for each monitored user emotional response, a type of the user emotional response;
   determine at least one mood associated with the identified attribute;

search the monitored user emotional responses for a given monitored user emotional response based on the retrieved user emotional response selection criterion and for which the determined type is similar to or different from the determined at least one mood;

identify which portion of the video media asset was presented to the user when the given user emotional response occurred; and generate, for the video media asset, a representation of the identified portion for inclusion in a media asset listing for the video media asset.

9. The system of claim 8, wherein the processor is further configured to:

determine, for each monitored user emotional response, characteristics of the user emotional response;

compute, for each monitored user emotional response, a user reaction score as a function of the determined characteristics; and rank the user reaction scores of the monitored user emotional responses, wherein the user emotional response selection criterion includes user reaction scores.

10. The system of claim 9, wherein the characteristics of a user emotional response include at least one of duration and intensity of the user emotional response.

11. The system of claim 9, wherein:

the storage device is further configured to store sets of weights; and the processor is further configured to:

determine, for each monitored user emotional response, the type of the user emotional response; and retrieve from the storage device a set of weights according to the determined type of the user emotional response, wherein the user reaction score is computed as a weighted function of the characteristics of the user emotional response using the retrieved set of weights.

12. The system of claim 11, wherein the type of the user emotional response is selected from the group consisting of agitation, amusement, anger, annoyance, astonishment, attentiveness, boredom, calmness, disappointment, disgust, fear, grief, indifference, nervousness, rage, sadness, surprise, and terror.

13. The system of claim 8, wherein the attribute is selected from the group consisting of genre, sub-genre, setting, theme, content type, artistic status, and target audience.

14. The system of claim 8, wherein the processor is further configured to replace a graphical representation for the video media asset previously selected by a content provider with the generated representation of the identified portion of the video media asset, wherein the generated representation of the identified portion is graphical.

* * * * *